United States Patent
Annen et al.

(10) Patent No.: US 9,975,732 B2
(45) Date of Patent: May 22, 2018

(54) SAFETY EQUIPMENT OF AN ELEVATOR INSTALLATION

(71) Applicant: Inventio AG, Hergiswil (CH)

(72) Inventors: Mirco Annen, Küssnacht am Rigi (CH); David Michel, Thalwil (CH)

(73) Assignee: INVENTIO AG, Hergiswil (CH)

( * ) Notice: Subject to any disclaimer, the term of this patent is extended or adjusted under 35 U.S.C. 154(b) by 410 days.

(21) Appl. No.: 14/436,501

(22) PCT Filed: Oct. 18, 2013

(86) PCT No.: PCT/EP2013/071865
§ 371 (c)(1),
(2) Date: Apr. 17, 2015

(87) PCT Pub. No.: WO2014/060587
PCT Pub. Date: Apr. 24, 2014

(65) Prior Publication Data
US 2015/0274487 A1    Oct. 1, 2015

(30) Foreign Application Priority Data
Oct. 18, 2012   (EP) .................................... 12189011

(51) Int. Cl.
*G05B 13/00*     (2006.01)
*B66B 5/06*      (2006.01)
(Continued)

(52) U.S. Cl.
CPC .............. *B66B 5/06* (2013.01); *B66B 5/0031* (2013.01); *G05B 9/02* (2013.01)

(58) Field of Classification Search
CPC ........... B66B 1/3407; B66B 5/06; B66B 5/16; B66B 5/0031; G01D 5/142; G01P 15/00; G05B 15/02; G05B 9/02
(Continued)

(56) References Cited

U.S. PATENT DOCUMENTS

| 7,743,891 B2 * | 6/2010 | Tyni .................... B66B 1/3476 187/393 |
| 2012/0000729 A1 * | 1/2012 | Marvin ................ B66B 5/044 187/287 |

(Continued)

FOREIGN PATENT DOCUMENTS

| CN | 101353126 A | 1/2009 |
| EP | 0838660 A1 | 4/1998 |

(Continued)

*Primary Examiner* — Jeffrey Donels
(74) *Attorney, Agent, or Firm* — William J. Clemens; Shumaker, Loop & Kendrick, LLP (57) ABSTRACT

A method and an equipment for monitoring the movement of an elevator car detect an acceleration of the elevator car and a travel speed or a travel distance of the elevator car and an integrated travel speed is calculated from the detected acceleration. In that case, the detected travel speed or the travel speed derived from the detected travel distance is used as a start variable of an integration cycle. In addition, the integrated travel speed is compared with at least one predetermined limit speed and a safety measure is triggered if exceeding of the predetermined limit speed is established.

21 Claims, 4 Drawing Sheets

(51) Int. Cl.
    *B66B 5/00*     (2006.01)
    *G05B 9/02*     (2006.01)

(58) Field of Classification Search
    USPC .................................................. 187/393, 247
    See application file for complete search history.

(56) References Cited

U.S. PATENT DOCUMENTS

| | | | | |
|---|---|---|---|---|
| 2013/0264149 | A1* | 10/2013 | Okamoto | B66B 5/06 187/247 |
| 2015/0014098 | A1* | 1/2015 | Stolzl et al. | B66B 5/0031 187/248 |
| 2015/0075915 | A1* | 3/2015 | Stolt | B66B 1/30 187/247 |
| 2015/0251877 | A1* | 9/2015 | Niikawa | B66B 5/04 187/305 |
| 2015/0274487 | A1* | 10/2015 | Annen | B66B 5/06 700/275 |

FOREIGN PATENT DOCUMENTS

| | | | |
|---|---|---|---|
| EP | 1602610 | A1 | 12/2005 |
| EP | 1626025 | A2 | 2/2006 |
| JP | 2009023823 | A | 2/2009 |
| WO | 0039016 | A1 | 7/2000 |
| WO | 2009013114 | A1 | 1/2009 |
| WO | 2010107409 | A1 | 9/2010 |

\* cited by examiner

SAFETY EQUIPMENT OF AN ELEVATOR INSTALLATION

FIELD

The invention relates to a method of monitoring the movement of an elevator car and to safety equipment for carrying out the method.

BACKGROUND

An elevator installation is installed in a building or attached thereto. It essentially consists of a car which is connected by way of support means with a counterweight or with a second car. The car is moved along substantially vertical guide rails by means of a drive which acts selectably on the support means or directly on the car or counterweight. The elevator installation is used for transporting persons and goods within the building over single or several floors.

The elevator installation comprises devices for safeguarding the elevator car in the case of failure of the drive, support means or other elevator components. These safeguards usually include a number of safety measures. A first safety measure is, for example, switching-off of the elevator drive and actuation of drive brakes in order to stop the elevator car. This is usually carried out by interruption of an elevator safety circuit. A further safety measure comprises activation of safety-brake devices or corresponding safety brakes. These can, when required, brake the elevator car on the guide rails or at brake rails. The safety measures are these days increasingly controlled by so-called electronic limiters which monitor movements of the elevator car.

A method for secure detection of movement states of an elevator installation is known from patent publication EP 1602610. In that case, several movement variables are detected at different locations and compared with one another and multi-stage braking measures are initiated if impermissible deviations are ascertained.

Monitoring equipment is known from a further patent publication WO2010/107409, wherein a cleaned or filtered speed signal is calculated from a combination of speed measurement and acceleration measurement.

Similar monitoring equipment is known from patent publication JP2009/023823, wherein a cleaned speed signal is calculated from a combination of travel distance measurement and acceleration measurement. In that case, an integrator calculates speed changes between measuring points of the travel distance meter. The speeds determined from the data of the travel distance meter and speed change calculated by the integrator are added and a reset logic sets the integrator to zero on each occasion when, for example, the travel distance meter registers a measuring point.

SUMMARY

The invention has an object of providing an alternative method and corresponding safety equipment for monitoring the movement of an elevator car, wherein a high level of reliability and security of the generated signal are to be achieved.

The solutions described in the following enable secure, rapid-reaction and reliable monitoring of the movement of an elevator car. Safety measures can be carried out rapidly in the case of an emergency.

According to one aspect of the invention the safety equipment for monitoring the movement of an elevator car detects, preferably by means of a first movement sensor, an acceleration of the elevator car and, preferably by means of a second movement sensor, a travel speed or travel distance of the elevator car. The user has various possibilities for detection of the second movement variable. In the case of use of a first movement sensor in the form of a tachometer use is usually made of a generator which, for example, is driven by a friction wheel moved along the guide rails together with the elevator car. A tachometer of that kind generates an electrical signal which is proportional to the rotational speed and thus to the travel speed and which can be converted by a converter into, preferably, a digital signal of the travel speed of the elevator car. In the case of use of a first movement sensor in the form of an incremental transmitter or other travel-based sensor system a corresponding signal of the travel speed of the elevator car is derived from the detected travel increments.

Moreover, the safety equipment determines, preferably in an integration routine, an integrated travel speed from the acceleration, which is detected by the first movement sensor, of the elevator car, wherein the travel speed detected or derived by the second movement sensor is used as a start variable of an integration cycle of the integration routine. Thus, on the one hand use is made of two different kinds of sensors for detecting the travel speed, which enables good mutual verification of the result, and on the other hand compensation is provided for, for example, a possible drift of the first movement sensor which detects the acceleration.

In addition, the integrated travel speed is now compared, preferably in a first monitoring module, with at least one predetermined limit speed and if the predetermined limit speed is exceeded one or more downstream safety measures are triggered.

Thus, a rapid and reliable method and system for monitoring the movement of the elevator car are provided. Reliable because the movement variables can be detected redundantly by different detection methods and rapid because by means of the detected acceleration a system, which is independent of slip and travel increment, for providing an integrated travel speed is present. Slip and travel increments lead, particularly in the case of rapid changes in movement, to values which are inaccurate and delayed in time.

In a preferred solution variant the integrated travel speed is compared, preferably in a first comparison routine, with the detected or derived travel speed and a new integration cycle is started, with use of the detected or derived travel speed, if a difference between the two travel speeds exceeds a first difference limit value or if a duration of the current integration cycle exceeds a predetermined time period. This comparison is carried out sporadically at relatively large intervals in time of, for example, up to one second and the first difference limit value is set to be generous.

For preference, a warning measure or safety measure is triggered if a difference between the two travel speeds exceeds a warning limit value or if a time plot of the difference between the two travel speeds exceeds an alarm value.

Small deviations between two different forms of detection are normal. Thus, considered over a longer time or a longer travel distance the detection result of a tachometer or an incremental transmitter is reliable, whilst rapid changes by detection of an acceleration can be recognized reliably. Thus, by the present solution it is possible to reliably provide compensation for, for example, drift of an acceleration sensor and at the same time rapid changes can also be reliably recognized.

In a preferred variant of solution, in addition a second acceleration of the elevator car is derived from the detected or derived travel speed of the elevator car and this second acceleration is compared, preferably in a second comparison routine, with the detected acceleration. In the case of agreement of the two accelerations an OK signal is generated and the OK signal is used for releasing the further integration of the integration routine. On the other hand, the safety measure is triggered if a difference between these two accelerations exceeds a defined acceleration difference limit value or if the OK signal is not issued. This comparison is preferably carried out frequently, for example at an interval of approximately 10 milliseconds, and the acceleration difference value for comparison of the two accelerations is calculated to be narrow. Obviously, the difference limit values and also the other limit values are fixed with consideration of the characteristics and measuring accuracies of the sensors present as well as of the elevator installation itself.

Overall, with this construction the quality and correctness of the signals and of the derivation routines are verified and thus the reliability and security of the monitoring system improved.

In a preferred variant of solution the acceleration detected by the first movement sensor is compared, preferably in a further, third comparison routine, with the second acceleration, which is derived from the detected or derived travel speed of the elevator car, of the elevator car in mirror image to the second comparison routine. In this case as well the safety measure is triggered if the difference between these two accelerations exceeds the defined acceleration difference limit value. This comparison is also frequently carried out in parallel with the second comparison routine and the acceleration difference limit value to the comparison of the two accelerations is similarly calculated to be narrow. These limit values are also fixed with consideration of the characteristics and measuring accuracy of the sensors present and the elevator installation itself, wherein for preference use is made of the same limit values as used in the second comparison routine.

The two routines, i.e. the second and the third comparison routines, preferably take place in synchronism. Consequently, in the case of correct functioning of the comparison routines the result of the comparison should be substantially identical. These comparison values can thus be checked for equality in a supplementary assessment, wherein obviously if equality is absent appropriate safety measures or servicing requirements can be undertaken.

The safety equipment for monitoring the movement of the elevator car preferably comprises at least one first processor unit and second processor unit and the sensors, comparison routines, monitoring modules and computing routines are apportioned to the two processor units. Thus, for example, the first movement sensor for detection of the acceleration, the integration routine, the first monitoring module and if need be the first and second comparison routines are executed as a component of the first processor unit or as functional groups with respect to the first processor unit. The second movement sensor for detecting the travel speed or the travel distance of the elevator car, possible computing routines and differentiators as well as, if need be, the third comparison routine are executed as a component of the second processor unit or as functional groups with respect to the second processor unit. A high level of reliability of the safety equipment is achievable with an architecture of separate processor units for processing and independent parallel evaluation of the detected signals of the at least two movement sensor, since the processor units can initiate possible safety measures independently of one another.

The safety equipment preferably comprises a second monitoring module, which compares the travel speed, which is detected or derived by the second movement sensor, with at least one predetermined limit speed and which triggers the safety measure if the predetermined limit speed is exceeded. This second monitoring module is preferably associated with the second processor unit. The travel speed of the elevator car is thus separately monitored twice, whereby overall safety is increased.

The safety equipment preferably comprises a fourth comparison routine, which compares the travel speed, which is detected or derived by the second movement sensor, with the travel speed integrated by the integration routine and which triggers a warning measure or safety measure if the difference between the two travel speeds exceeds the warning limit value or if a time plot of the difference between the two travel speeds exceeds an alarm value. This fourth comparison routine is preferably associated with the second processor unit. Thus, the quality of the safety equipment is in addition redundantly monitored in the two processor units and overall safety is correspondingly improved. Analogously to the first comparison routine, the comparison of the fourth comparison routine is also carried out sporadically at relatively large intervals in time and the associated first difference limit value is set to be generous. The fourth comparison routine is thus the comparison element redundant with respect to the first comparison routine.

The safety equipment preferably comprises a third monitoring module, which compares the acceleration, which is detected by the first movement sensor, of the elevator car with at least one predetermined limit acceleration and which triggers a safety measure if a predetermined limit acceleration is exceeded. This third monitoring module is preferably associated with the first processor unit. A serious fault in the elevator is directly and rapidly recognized by this third monitoring module if, for example, a high acceleration suddenly arises in the case of failure of support means. A braking measure can thus take place rapidly in the event of a fault of that kind.

The safety equipment can preferably trigger at least two different safety measures, wherein a first safety measure causes interruption of an elevator safety circuit and a second safety measure causes actuation of a safety-brake device of the elevator car. The elevator safety circuit is a central functional chain, which has to be intact or closed for movement of the elevator car, in the elevator installation. Thus, the elevator safety circuit is, for example, opened if a shaft door is opened. Interruption in the elevator safety circuit has the effect that a drive of the elevator installation is stopped and appropriate drive brakes are brought into action. Insofar as the safety equipment now ascertains an unusual deviation in the course of movement or a function of the safety equipment is no longer guaranteed, in the usual case as a first safety measure this elevator safety circuit is interrupted and thus the elevator installation stopped. If the deviation in the course of movement further increases notwithstanding the first safety measure or the deviations are very large then as a rule—as a second safety measure— safety brakes are actuated which firmly clamp the elevator car directly to guide rails and thus securely brake and hold the elevator car. The safety brakes are usually controlled by a brake control. Actuation of the safety brakes in these cases takes place by way of this brake control.

The second movement sensor of the safety equipment is preferably arranged in the region of an elevator car roller, preferably in the region of a support means deflecting roller arranged on the car, and is driven by this. The travel speed or the travel distance of the elevator car can thus be accurately detected from a rotational movement of the elevator car roller or the support means deflecting roller. Elevator car rollers or also support means deflecting rollers are incorporated in the support structure of the elevator car. In that case, the load on the roller is of such a magnitude that slip is reduced and at the same time a fault in the support structure also leads, with a high level of probability, to influencing of the movement variable detected by the second movement sensor. This is reliably recognized by the aforesaid comparison routine and requisite safety measures can thus be initiated.

The safety equipment preferably comprises first safety equipment and second safety equipment, wherein the two items of safety equipment are constructed as explained in the foregoing embodiments. The first safety equipment is in that case preferably arranged in the region of a first support means deflecting roller of the elevator car and the second safety equipment is arranged in the region of a second support means deflecting roller of the elevator car. Overall safety is thus substantially increased, since, in total, use is made of two movement sensors for detection of the acceleration of the elevator car and for detection of the travel speed or the travel distance and are compared with one another and evaluated.

DESCRIPTION OF THE DRAWINGS

Exemplifying embodiments are explained in the following by way of examples and schematic constructions, wherein.

The same reference numerals are used in the figures for equivalent parts over all figures.

DETAILED DESCRIPTION

Figure 1:
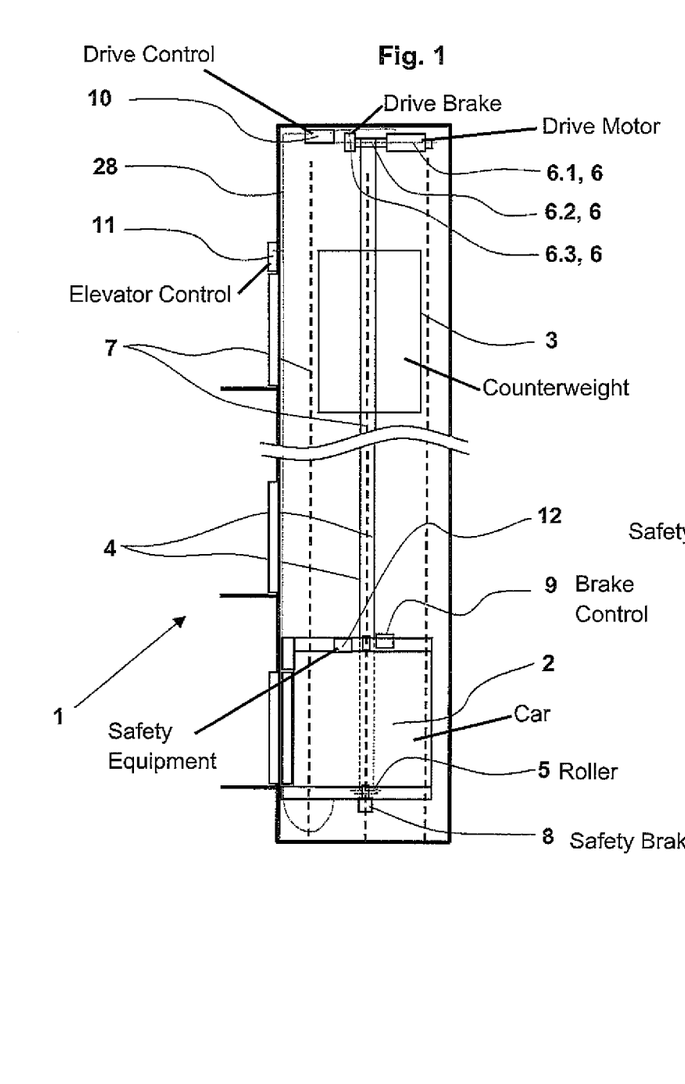
FIG. 1 shows a schematic view of an elevator installation in side view.

An elevator installation 1 is, as apparent in FIG. 1, installed in or attached to a building and serves for the transport of persons or goods within the building. The elevator installation comprises an elevator car 2, which can move upwardly and downwardly along guide rails 7. A drive 6 serves for driving and holding the elevator car 2. The drive 6 is, for example, arranged in the upper region of the building and the car 2 hangs by support means 4, for example support cables or support belts, at the drive 6 or at drive pulleys 6.2 of the drive 6. The support means 4 are guided by way of the drive pulleys 6.2 to a counterweight 3. A drive motor 6.1 of the drive 6 drives the drive pulleys 6.2 and thereby the support means 4 and thus the elevator car 2 and the counterweight 3. A drive brake 6.3 brakes, when required, the drive pulleys 6.2 or holds them in a rest position. The drive 6 can obviously also be arranged in a different location in the building or in the region of the car 2 or the counterweight 3.

In the present example the support means 4 are guided by way of support means deflecting rollers 5 of the elevator car 2. The elevator car 2 and—obviously—correspondingly also the counterweight 3 are suspended and driven in 2:1 relationship. A movement sensor 14 (FIG. 3) for detecting a travel speed or a travel distance of the elevator car is arranged at or in at least one of the support means deflecting rollers 5. The signals of the movement sensor 14 are passed on to safety equipment 12.

The elevator installation 1 is controlled by an elevator control 11. The elevator control 11 receives user requests, optimizes the operating sequence of the elevator installation and controls, usually by way of a drive control 10, the drive 6. The elevator control 11 or the drive control 10 additionally monitors the safety state of the elevator installation and interrupts travel operation if an unsafe operating state arises. This monitoring is usually carried out with use of an elevator safety circuit 28, in which all safety-relevant functions are incorporated. Also included in the monitoring of that kind or in this elevator safety circuit are, for example, shaft door contacts which monitor correct closing of the shaft doors and there is also monitoring of, for example, limit positions of the travel body 2, 3 in the elevator shaft. Interruption of the elevator safety circuit 28 causes switching-off of the drive motor 6.1 and actuation of the drive brake 6.3, whereby the elevator installation 1 is usually, i.e. in the case of correct functioning of the supporting and drive system, stopped.

The elevator car 2 and, if required, also the counterweight 3 are additionally equipped with a brake system, which is suitable for securing and/or retarding the elevator car 2 or the counterweight 3, respectively, in the case of unexpected movement or excess speed, even in the case of failure of the supporting and drive system. The brake system comprises, in the example, two identical safety brakes or safety-brake devices 8 which are attached to the elevator car 2 or the counterweight 3 on both sides thereof. The safety-brake devices 8 are, in the example, arranged underneath the elevator car 2 and are electrically activated by way of a brake control 9. This brake control 9 is connected with the safety equipment 12 of the elevator installation, which monitors the movement of the elevator car 2 or the counterweight 3 and, if required, causes actuation of the safety-brake devices 8 or interrupts the elevator safety circuit 28. The brake control 9 and the safety equipment 12 can be separate components, but they can obviously also be combined into a functional group or even integrated into an elevator or drive control 11, 10. A mechanical speed limiter, as is usually employed, can be eliminated, since the safety equipment 12 takes over this task. In the case of appropriate design of the safety-brake device 8, for example by redundant brake circuits, appropriate control algorithms and reset functions the drive brake 6.3 can possibly be eliminated and the elevator safety circuit 28 can directly act on the brake control 9.

Figure 2:
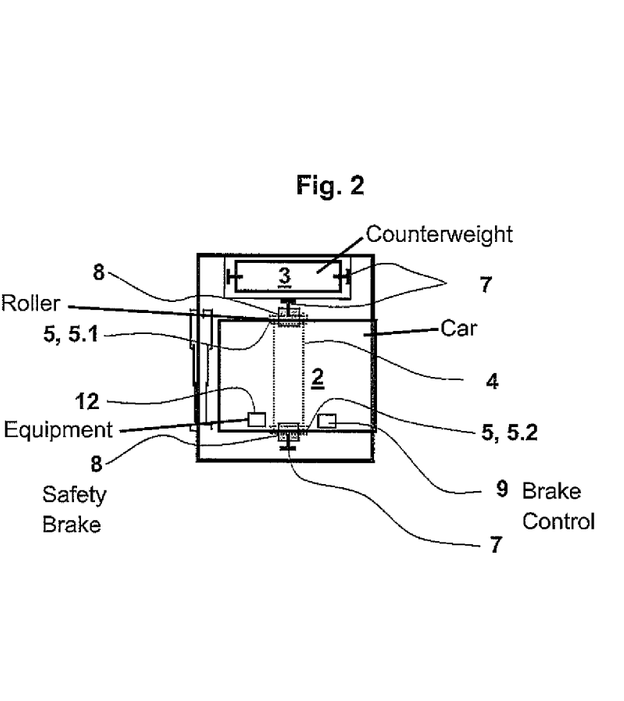
FIG. 2 shows a schematic view of the elevator installation in cross-section.

FIG. 2 shows the elevator installation of FIG. 1 in a schematic plan view. The brake system comprises the two safety-brake devices 8. The two safety-brake devices 8 are electrically or mechanically coupled so that the two safety-brake devices 8 are actuated together. Unintended braking or safety-braking on one side is thus avoided. The two safety-brake devices 8 are preferably of identical or mirror-symmetrical construction and they act on the guide rails 7 arranged on either side of the car 2.

Figure 3:
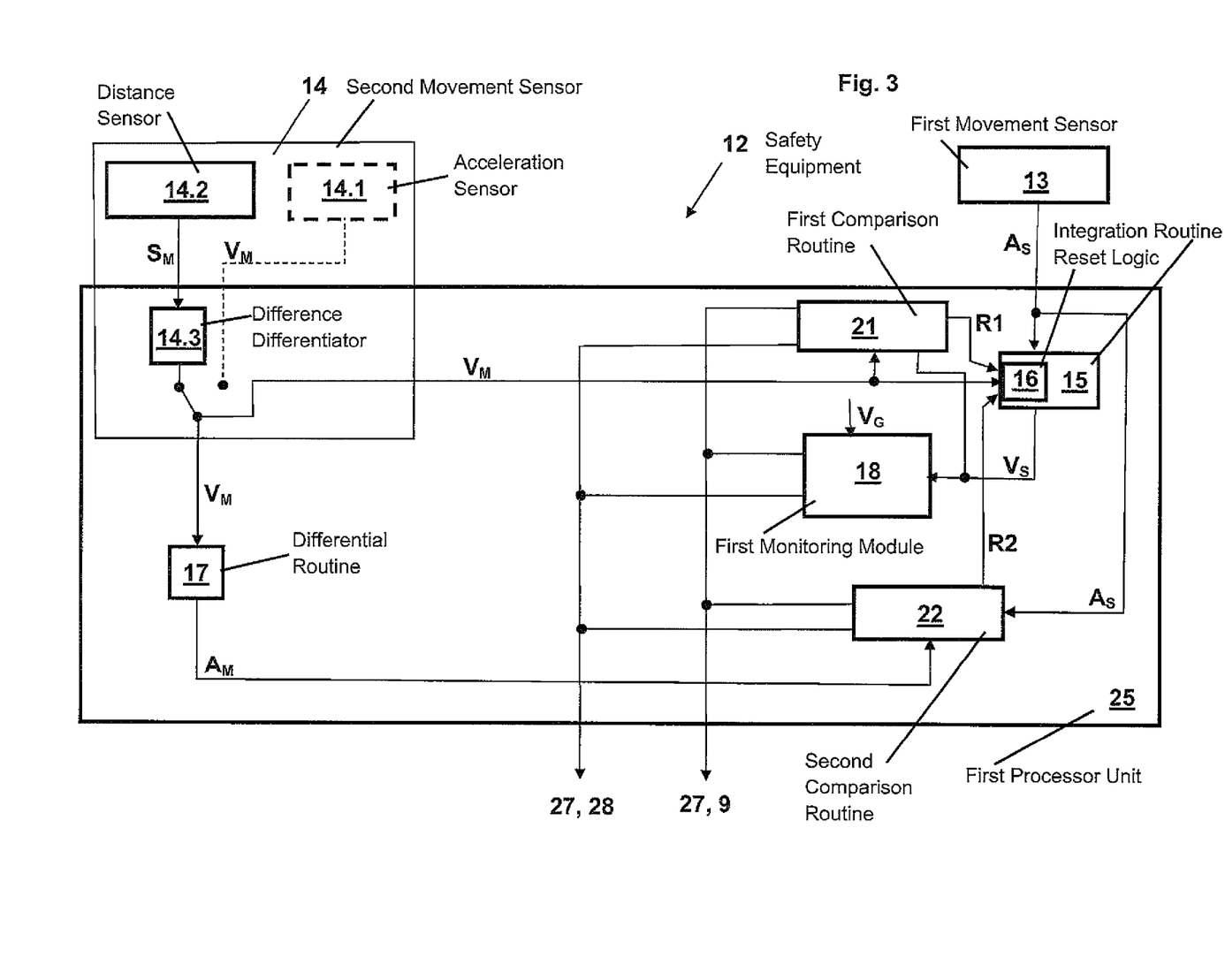
FIG. 3 shows a first embodiment of safety equipment.

The safety equipment 12, which monitors the movement of the elevator car, includes in a first embodiment, as illustrated in FIG. 3, a first movement sensor 13 for detecting an acceleration $A_S$ of the elevator car 2. This first movement sensor 13 is arranged at the elevator car 2 or fastened thereto so that it can detect at least the accelerations of the elevator car in vertical direction. An integration routine 15 calculates from this acceleration an integrated travel speed $V_S$, wherein obviously the acceleration is corrected by the amount of gravitational acceleration.

In addition, the safety equipment 12 includes a second movement sensor 14, which with reference to FIG. 1 is attached to one of the support means deflecting rollers 5 and which, in one embodiment, detects angular movements of the support means deflecting roller 5 by means of an incremental counter 14.2. With knowledge of the roll diameter of the support means deflecting roller 5 a travel distance $S_M$ is detected therefrom and from this travel distance $S_M$ a travel speed $V_M$ is derived by means of a distance differential computer 14.3. Alternatively, instead of the incremental counter 14.2 and the distance differential computer 14.3 use can be made of a tachometer 14.1 which directly detects the travel speed $V_M$, as illustrated by dashed lines in FIG. 3. In addition, a differential routine 17 calculates a derived acceleration $A_M$ from the travel speed $V_M$ detected or derived by the second movement sensor 14.

The signals of acceleration sensors, such as used for detecting accelerations of the elevator car 2, have small inaccuracies attributable to the system. This leads by way of the integration to summation of these inaccuracies, which over a longer period of time leads to falsification of the result. In order to compensate for these inaccuracies or drift a new integration cycle, with use of the travel speed $V_M$ detected by the second movement sensor as a start variable, is started at an interval in time if specific travel events occur or if a difference dV between the travel speed $V_M$ detected by the second movement sensor and the travel speed $V_S$ integrated by the first movement sensor exceeds a defined amount. For that purpose, a reset logic 16 is added to the integration routine 15. The reset logic 16 controls the integration sequence of the integration routine 15 and supplies the travel speed $V_M$, which is detected by the second movement sensor 14, on each occasion as start variable of an integration cycle. In the embodiment of FIG. 3 for that purpose a first comparison routine 21 compares the integrated travel speed $V_S$ of the first movement sensor 13 with the detected travel speed $V_M$ and generates a warning signal R1 at the reset logic 16 if a difference dV between the two travel speeds $V_S$, $V_M$ exceeds a predetermined value of, for example, approximately 5% of a nominal speed. As soon as this warning level R1 is present at the reset logic 16 a new integration cycle is started, wherein then the travel speed $V_M$ detected by the second movement sensor is set as start variable of the new integration cycle. Continuous compensation is thus in principle provided for drift.

The comparison routine 21 in that case operates at long intervals in time of, for example, approximately 500 milliseconds. If the comparison routine 21 now establishes that the difference dV within this period of time is large, for example more than 10% of the nominal speed, a safety measure 27 is triggered. In a first step the elevator safety circuit 28 is thereby interrupted and thus the elevator installation stopped. If the difference dV within this period of time is even larger, for example more than 15% of the nominal speed, a brake control 9 for activation of the safety-brake devices is directly activated.

In addition to the first comparison routine 21 a second comparison routine 22 checks correct functioning of the first and second movement sensors 13, 14 in that it compares the acceleration $A_M$ derived from the second movement sensor 14 with the acceleration $A_S$ detected by the first movement sensor 13 and obviously cleaned with respect to gravitational acceleration. This second comparison routine 22 operates, by contrast to the first comparison routine 21, at high cyclic frequencies. An operating time interval of the second comparison routine 22 is, for example, approximately 10 milliseconds. As long as the second comparison routine establishes approximate agreement of the two accelerations $A_M$, $A_S$ an OK signal R2 is issued at the reset logic 16. This has the effect that the integration routine 15 is continued. If the two accelerations $A_M$, $A_S$ significantly differ from one another the OK signal is stopped, whereupon the reset logic 16 uses the respective greater one of the two travel speeds $V_S$, $V_M$ for a possible new integration cycle. At the same time the safety measure 27 is selectively initiated in that depending on the size of the difference between the two accelerations $A_M$, $A_S$ merely the elevator safety circuit 28 is interrupted or, possibly with a delay in time, the brake control 9 is activated.

The values indicated in the examples are merely by way of example. The time values, difference values and other values can be established in dependence on sensors used, travel speed, etc.

In addition, the safety equipment according to FIG. 3 includes a first monitoring module 18, which compares the integrated travel speed $V_S$ with a permissible limit speed $V_G$ and triggers the safety measure 27 if the permissible limit speed $V_G$ is exceeded. Usually, as a first safety measure 27 the elevator safety circuit 28 is interrupted if the so-called nominal speed of the elevator installation is exceeded by approximately 10% or the safety-brake device 8 is actuated if the nominal speed is exceeded by more than 15%.

Thus, the functioning of the two movement sensors is checked and monitored by means of comparison of the accelerations $A_M$, $A_S$, compensation for drift of the integrated travel speed $V_S$ is provided by means of sporadic comparison of the travel speeds $V_M$, $V_S$ and functioning of computation routines is checked. The travel speed of the elevator car can thus be reliably monitored.

In the example, the calculation routines 15, 17, 14.3, the comparison routines 21, 22 and the monitoring module 18 are arranged on a circuitboard or on a processor unit 25. In addition, the first movement sensor 13 can also be a component of this processor unit 25 and the entire safety equipment 12 can be arranged in the region of support means deflecting rollers 5 (see FIGS. 1 and 2). The arrangements can obviously also be selected to be different. Thus, by way of example, the second movement sensor 14 together with the differential routine 17 can form a processor unit and the remaining components such as integration routine 15, the comparison routines 21, 22 and the monitoring module 18 can be combined in another processor unit.

Figure 4:
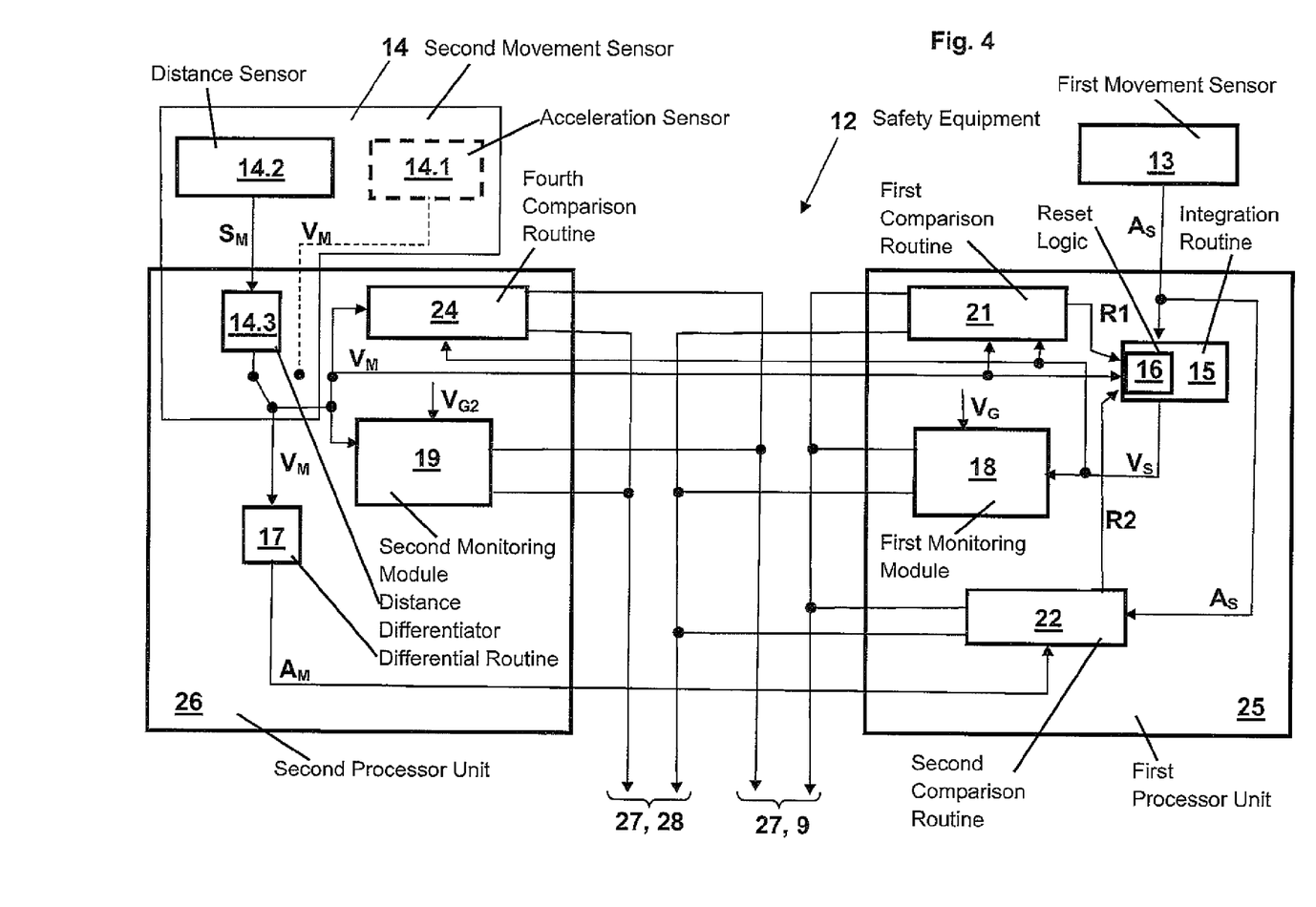
FIG. 4 shows a second embodiment of enlarged safety equipment.

In a further embodiment, as is illustrated in FIG. 4, the safety equipment 12 comprises, in addition to the safety equipment explained in the preceding, a second monitoring module 19 which compares the travel speed $V_M$, which is detected or derived by the second movement sensor 14, with an allowable limit speed $V_{G2}$ and, analogously to the first monitoring module 18, triggers the safety measure 27 if the allowable limit speed is exceeded. As a rule, the permissible limit speed $V_{G2}$ is set to be identical with the limit speed $V_G$. In addition, the safety equipment 12 includes a fourth comparison routine 24, which in partial analogy to the first comparison routine 21 compares the travel speed $V_M$ detected or derived by the second movement sensor 14 with the integrated travel speed $V_S$ of the first movement sensor 13. This fourth comparison routine 24 similarly triggers, like the first comparison routine 21, a safety measure 27 if the difference within a set time interval is large.

In this embodiment the integration routine 15 with associated reset logic 16, the first and second comparison routines 21, 22 and the monitoring module 18 are arranged on a first processor unit 25. This first processor unit 25 is associated with the first movement sensor 13 or the first movement sensor 13 is integrated in the first processor unit 25. The remaining subassemblies such as the differential routine 17, the monitoring module 19 and the fourth comparison routine 24 are arranged on a second processor unit 26 in connection with the distance sensor 14.2 and the distance differentiator 14.3 or the speed tachometer 14.1. The security of this safety equipment with two processor units 25, 26 is particularly reliable, since important functions are processed in redundant manner and the two processor units 25, 26 can initiate safety measures 27 independently of one another.

Figure 5:
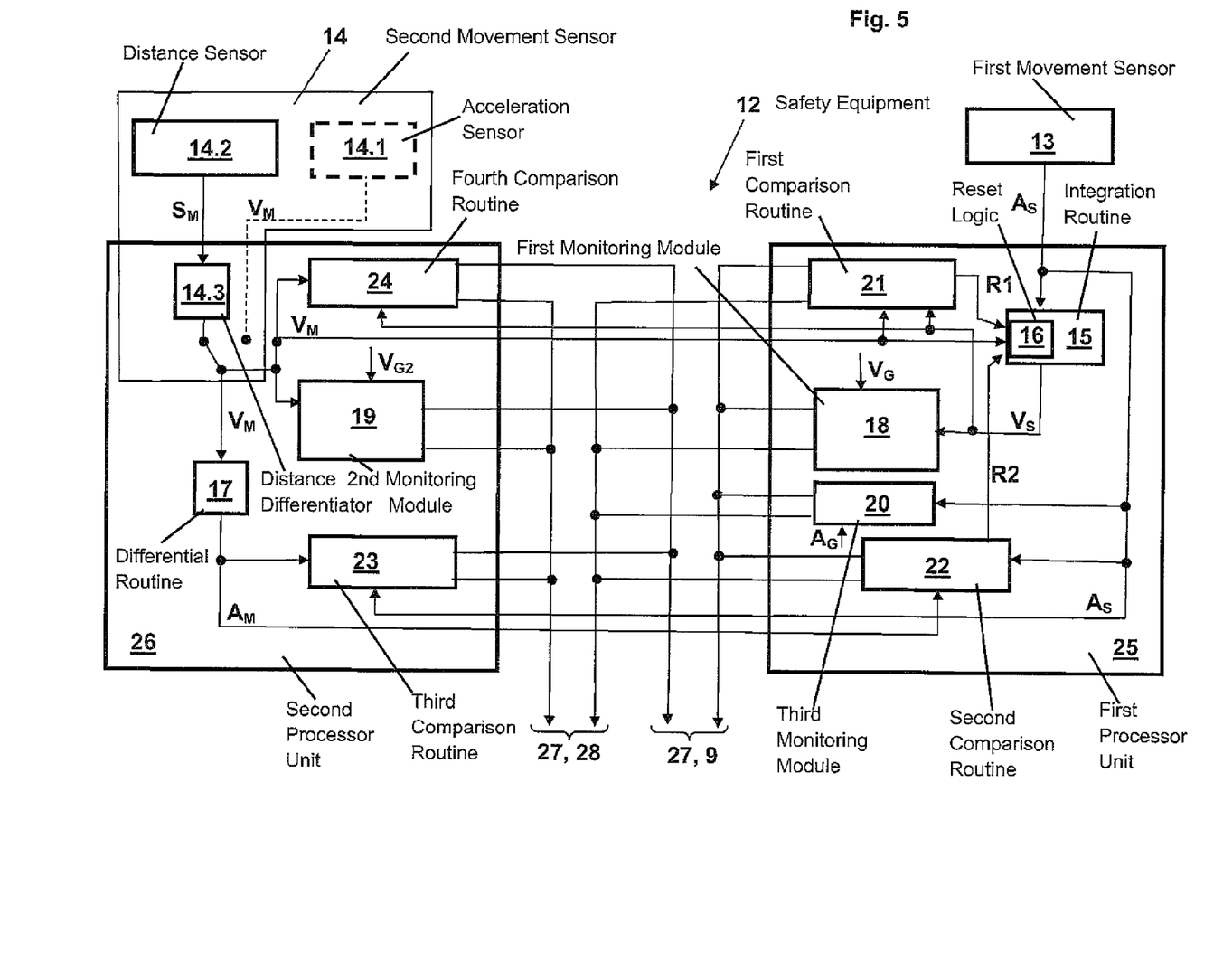
FIG. 5 shows a third embodiment of enlarged safety equipment.

A further embodiment, as illustrated in FIG. 5, further includes, additionally by comparison with the preceding embodiments, a third monitoring module 20, which is arranged at the first processor unit 25 and which compares the acceleration $A_S$, which is detected by the first movement sensor 13, of the elevator car with at least one predetermined limit acceleration $A_G$ and triggers a safety measure 27 if the predetermined limit acceleration $A_G$ is exceeded. This third monitoring module 20 is provided primarily for the purpose of rapidly detecting a possible freefall or crashing down of an elevator car.

Moreover, provided in this embodiment is a third comparison routine 23 which is arranged at the second processor unit 26 and which analogously to the second comparison routine 22 checks correct functioning of the first and second movement sensors 13, 14 in that it compares the acceleration $A_S$, which is detected by the first movement sensor 13 and obviously cleaned with respect to gravitational acceleration, with the acceleration $A_M$ derived from the second movement sensor 14 and triggers possible safety measures if the comparison reveals excessive deviations.

The illustrated embodiments can be varied by the expert. Depending on the required safety level, redundant comparison routines 23, 24 or the redundant monitoring module 19 can be omitted. The entire safety equipment 12 can possibly be duplicated in one of the embodiments or a variation thereof so that one safety equipment is arranged at a first support means deflecting roller 5.1 and a second safety equipment is arranged at a second support means deflecting roller 5.2. Safety of the entire installation is improved by this redundant arrangement. In addition, instead of the incremental sensors or tachogenerators mentioned in the embodiments use can obviously also be made of absolute position systems or other travel measuring systems. The method and the safety equipment are illustrated and explained in the embodiments in the application with respect to monitoring the movements of the elevator car. The method or equipment can obviously also be used in the same mode and manner at the counterweight.

In accordance with the provisions of the patent statutes, the present invention has been described in what is considered to represent its preferred embodiment. However, it should be noted that the invention can be practiced otherwise than as specifically illustrated and described without departing from its spirit or scope.

REFERENCE NUMBER LIST (NOT PART OF THE APPLICATION)

1 lift installation
2 travel body, lift cage
3 travel body, counterweight
4 support means
5 lift cage roller/support means deflecting roller
6 drive
6.1 drive motor
6.2 drive pulleys
6.3 drive brake
7 guide rails
8 safety brake
9 brake control
10 drive control
11 lift control
12 safety equipment
13 first movement sensor
14 second movement sensor
14.1 acceleration sensor
14.2 distance sensor
14.3 distance differentiator
15 integration routine
16 reset logic
17 differential routine
18 first monitoring module
19 second monitoring module
20 third monitoring module
21 first comparison routine
22 second comparison routine
23 third comparison routine
24 fourth comparison routine
25 first processor unit
26 second processor unit
27 safety measure
28 lift safety circuit
SM detected travel distance
VM travel speed
VS integrated travel speed
AS acceleration
AM second (derived) acceleration

The invention claimed is:

1. A method of monitoring movement of an elevator car, comprising the steps:
    detecting an acceleration of the elevator car;
    detecting a travel speed of the elevator car or a travel distance of the elevator car, wherein when the travel distance is detected, deriving the travel speed from the detected travel distance of the elevator car;
    deriving an acceleration of the elevator car from the travel speed of the elevator car, and
    comparing the detected acceleration with the derived acceleration, if there is agreement of the compared accelerations generating an OK signal and continuing monitoring movement of the elevator car in response to the OK signal, and if the difference between the compared accelerations exceeds an acceleration difference limit value or if the OK signal is not generated triggering a safety measure.

2. The method according to claim 1 comprising the steps:
    comparing the detected acceleration of the elevator car with at least one predetermined limit acceleration; and
    triggering the safety measure if the detected acceleration exceeds the predetermined limit acceleration.

3. The method according to claim 1 comprising the steps:
    determining an integrated travel speed by integration of the detected acceleration of the elevator car, wherein the detected travel speed or the derived travel speed is used as a start variable of an integration cycle; and comparing the integrated travel speed with at least one permissible limit speed and triggering the safety measure if exceeding of the permissible limit speed is established.

4. The method according to claim 1, wherein the safety measure includes one of interruption of an elevator safety circuit and actuation of a safety-brake device of the elevator car.

5. A method of monitoring movement of an elevator car, comprising the steps:
   detecting an acceleration of the elevator car;
   detecting a travel speed of the elevator car or a travel distance of the elevator car, wherein when the travel distance is detected, deriving the travel speed the detected travel distance of the elevator car;
   determining an integrated travel speed by integration of the detected acceleration, wherein the detected travel speed or the derived travel speed is used as a start variable of an integration cycle, wherein when the integrated travel speed is compared with the detected travel speed or the derived travel speed and starting a new integration cycle if a difference between the compared speeds exceeds a predetermined difference limit value or if a duration of a current integration cycle exceeds a predetermined time period; and
   comparing the integrated travel speed with a permissible limit speed and triggering a safety measure if exceeding of the permissible limit speed is established.

6. The method according to claim 5, wherein the safety measure includes one of interruption of an elevator safety circuit and actuation of a safety-brake device of the elevator car.

7. A method of monitoring movement of an elevator car, comprising the steps:
   detecting an acceleration of the elevator car;
   detecting a travel speed of the elevator car or a travel distance of the elevator car, wherein when the travel distance is detected, deriving the travel speed the detected travel distance of the elevator car;
   determining an integrated travel speed by integration of the detected acceleration, wherein the detected travel speed or the derived travel speed is used as a start variable of an integration cycle, wherein the integrated travel speed is compared with the detected travel speed or the derived travel speed and a warning measure or the safety measure is triggered if at least one of a difference between the integrated travel speed and the detected travel speed or the derived travel speed exceeds a warning limit value and a time plot of the difference between the integrated travel speed and the detected travel speed or the derived travel speed exceeds an alarm value; and
   comparing the integrated travel speed with a permissible limit speed and triggering a safety measure if exceeding of the permissible limit speed is established.

8. The method according to claim 7, wherein the safety measure includes one of interruption of an elevator safety circuit and actuation of a safety-brake device of the elevator car.

9. A safety equipment of an elevator installation for monitoring movement of an elevator car, comprising:
   a first movement sensor for detecting an acceleration of the elevator car;
   a second movement sensor for detecting a travel speed of the elevator car or a travel distance of the elevator car, wherein when the travel distance is detected, the travel speed is derived from the travel distance;
   a processor unit for deriving an acceleration of the elevator car from the detected travel speed or the derived travel speed;
   a comparison routine performed by the processor unit for comparing the detected acceleration with the derived acceleration and if the compared accelerations are in agreement generating an OK signal; and
   an integration routine performed by the processor unit and responsive to the OK signal for release or continuation of an integration, or for triggering a safety measure if a difference between the compared accelerations exceeds an acceleration difference limit value or if the OK signal is not generated.

10. The safety equipment according to claim 9 wherein the integration routine determines an integrated travel speed from the detected acceleration, wherein the integration routine uses the detected travel speed or the derived travel speed as a start variable of an integration cycle, and including a first monitoring module for comparing the integrated travel speed with a permissible limit speed and triggering the safety measure if the permissible limit speed is exceeded.

11. The safety equipment according to claim 10 wherein another comparison routine compares the integrated travel speed with the detected travel speed or the derived travel speed and starts a new integration cycle if a difference between the compared travel speeds exceeds a difference limit value or if the duration of a current integration cycle exceeds a predetermined time period.

12. The safety equipment according to claim 11 wherein the another comparison routine compares the integrated travel speed with the detected travel speed or the derived travel speed and triggers a warning measure or the safety measure if a difference between the compared travel speeds exceeds a warning limit value or a time period of the difference between the compared travel speeds exceeds an alarm value.

13. The safety equipment according to claim 10 including a second monitoring module for comparing the detected travel speed or the derived travel speed with another permissible limit speed and triggering the safety measure if the another permissible limit speed is exceeded.

14. The safety equipment according to claim 13 including a third monitoring module for comparing the detected acceleration with a predetermined limit acceleration and triggering the safety measure if the predetermined limit acceleration is exceeded.

15. The safety equipment according to claim 9 including another comparison routine for comparing the detected travel speed or the derived travel speed with a travel speed integrated by the integration routine and triggering a warning measure or the safety measure if a difference between the compared travel speeds exceeds a warning limit value or if a time plot of the difference exceeds an alarm value.

16. The safety equipment according to claim 9 wherein the processor unit is a first processor unit and including a second processor unit, wherein the first processor unit is connected with the first movement sensor and the second processor unit is connected with the second movement sensor, wherein the second processor unit includes another comparison routine and a differential routine, and wherein each of the first and second processor units includes at least one monitoring module.

17. The safety equipment according to claim 16 wherein the integration routine determines an integrated travel speed from the detected acceleration, the first processor unit includes a first monitoring module for comparing the integrated travel speed with a permissible limit speed and triggering the safety measure if the permissible limit speed is exceeded by the integrated travel speed, wherein the comparison routine of the first processor unit is a second comparison routine and the first processor unit includes a first comparison routine for comparing the detected travel speed or the derived travel speed with the integrated travel speed and generating a warning signal if a difference between the compared speeds exceeds a predetermined value, wherein the another comparison routine for comparing the detected travel speed or the derived travel speed with the integrated travel speed and generating the safety measure if the if a difference between the compared speeds within a set time interval exceeds another predetermined value, and the second processor unit includes a second monitoring module for comparing the detected travel speed or the derived travel speed with an allowable speed limit and triggering the safety measure if the allowable speed limit is exceeded.

18. The safety equipment according to claim 17 wherein the first processor unit includes a third monitoring module for comparing the detected acceleration with a predetermined limit acceleration and triggering the safety measure if the predetermined limit acceleration is exceeded.

19. The safety equipment according to claim 17 wherein the another comparison routine is a fourth comparison routine and the second processor unit includes a third comparison routine for comparing the detected acceleration with the derived acceleration and triggering the safety measure if a predetermined acceleration difference limit is exceeded.

20. The safety equipment according to claim 9 wherein the second movement sensor is arranged at an elevator car roller or a support deflecting roller and the travel speed or the travel distance of the elevator car is detected from a rotational movement of the roller.

21. The safety equipment according to claim 20 including another one of the safety equipment arranged at another elevator car roller or another support deflecting roller and the travel speed or the travel distance of the elevator car is detected from a rotational movement of the another roller.

* * * * *